United States Patent
Swan

(10) Patent No.: US 6,710,819 B2
(45) Date of Patent: Mar. 23, 2004

(54) METHOD AND SYSTEM FOR IMPROVED DISPLAY FILTERING

(75) Inventor: Philip L. Swan, Richmond Hill (CA)

(73) Assignee: ATI Technologies, Inc., Markham (CA)

( * ) Notice: Subject to any disclaimer, the term of this patent is extended or adjusted under 35 U.S.C. 154(b) by 450 days.

(21) Appl. No.: 09/790,955

(22) Filed: Feb. 22, 2001

(65) Prior Publication Data

US 2002/0113899 A1 Aug. 22, 2002

(51) Int. Cl.$^7$ .............................. H04N 5/21; G06K 9/36
(52) U.S. Cl. ..................... 348/607; 348/447; 348/611; 382/236
(58) Field of Search ................................ 348/607, 447, 348/910, 226.1, 451, 666, 610, 611; 345/58; 382/240, 245, 248, 264, 274, 275, 236; 375/240.11, 240.19, 240.09, 240.29

(56) References Cited

U.S. PATENT DOCUMENTS

| | | | | |
|---|---|---|---|---|
| 5,182,643 A | * | 1/1993 | Futscher | 348/447 |
| 5,204,741 A | * | 4/1993 | Sakaguchi | 348/208.6 |
| 5,754,246 A | * | 5/1998 | Flannaghan | 348/459 |
| 5,844,619 A | * | 12/1998 | Songer | 348/447 |
| 5,892,551 A | * | 4/1999 | Uematsu | 348/447 |
| 5,914,753 A | * | 6/1999 | Donovan | 348/441 |
| 6,172,718 B1 | * | 1/2001 | Alvarez et al. | 348/625 |
| 6,307,971 B1 | * | 10/2001 | Persiantsev et al. | 382/236 |
| 6,346,970 B1 | * | 2/2002 | Boehlke | 348/447 |
| 6,392,718 B1 | * | 5/2002 | Muramatsu | 348/910 |
| 6,393,060 B1 | * | 5/2002 | Jeong | 375/240.19 |
| 6,556,193 B1 | * | 4/2003 | Auld et al. | 345/418 |
| 6,563,511 B1 | * | 5/2003 | Yeh et al. | 345/611 |

* cited by examiner

Primary Examiner—Michael H. Lee
Assistant Examiner—Paulos M Natnael
(74) Attorney, Agent, or Firm—Toler, Larson & Abel, LLP

(57) ABSTRACT

A method and a system for improved filtering of display data is disclosed herein. A display system may be used to separately filter display components of the display data based on frequency content of the display components. The display system can include a display data source, a digital image processor, and a display. The display system receives display data from the display data source. The frequency content of a plurality of display components in the display data is determined by the digital image processor. The digital image processor filters the plurality of display components based on the associated frequency content. In at least one embodiment, display components having lower frequency content are filtered to minimize flicker, while display components having higher frequency content are filtered to maximize resolution. The filtered display data is then transmitted to the display.

91 Claims, 9 Drawing Sheets

METHOD AND SYSTEM FOR IMPROVED DISPLAY FILTERING

FIELD OF THE DISCLOSURE

The present invention relates generally to video display systems and more particularly to filtering of video image data.

BACKGROUND

Some display systems utilize interlaced displays, such as televisions, to display image data generated by computers and other digital image systems. Interlaced displays display an entire display frame as a sequence of two individual fields, an odd field displaying the odd numbered rows of the display frame and an even field displaying the even numbered rows of the display frame. In this way, the fields are interlaced, and the human eye interprets the two fields shown sequentially as a complete display frame. For example, the National Television Systems Committee (NTSC) protocol for television video signals has standardized the field display rate at 60 Hz. Since there are two fields displayed per frame, the effective frame rate is 30 Hz.

The two interlaced fields may interfere when displaying small display components, such as computer text, causing flicker. Flicker is perceived when the frequency of modulated light falling on the retina of the human eye is below the Critical Fusion Frequency (CFF), which is about 72 Hz for most people. Since the field display rate, as well as the effective frame rate, of most televisions are below most people's CFF, flicker is often noticeable and detracts from the image quality.

It is known to use a low pass filter with a cut off frequency of approximately one-fourth the display resolution to filter across the vertical direction of the entire image to minimize or eliminate flicker. However, the use of a low pass filter with such a cut off frequency may blur some items, such as text, making them unrecognizable.

Therefore, a method and or system that overcomes this problem would be useful.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE FIGURES

In accordance with at least one embodiment of the present invention, a set of display data is received. A first portion of the display data having a first spatial component is identified. Additionally, a second portion of the display data having a second component is identified. The first portion of the display data is filtered by a first amount to reduce flicker. Similarly, the second portion of the display data is filtered by a second amount, less than the first amount. One advantage of this embodiment is that image content is more discernible. Another advantage is that flicker is reduced.

FIGS. 1–9 illustrate a display system with improved filtering in accordance with a specific embodiment of the present invention having a display data source, a digital image processor, and a display, as well as a method for its use. As described in greater detail below, the display system receives display data from the display data source. The frequency content of a plurality of display components of the display data is determined by the digital image processor. The digital image processor filters the plurality of display components based on the associated frequency content. In at least one embodiment, display components having lower frequency content are filtered to minimize flicker, while display components having higher frequency content are filtered to maximize resolution. The filtered display data is then transmitted to the display.

Figure 1:
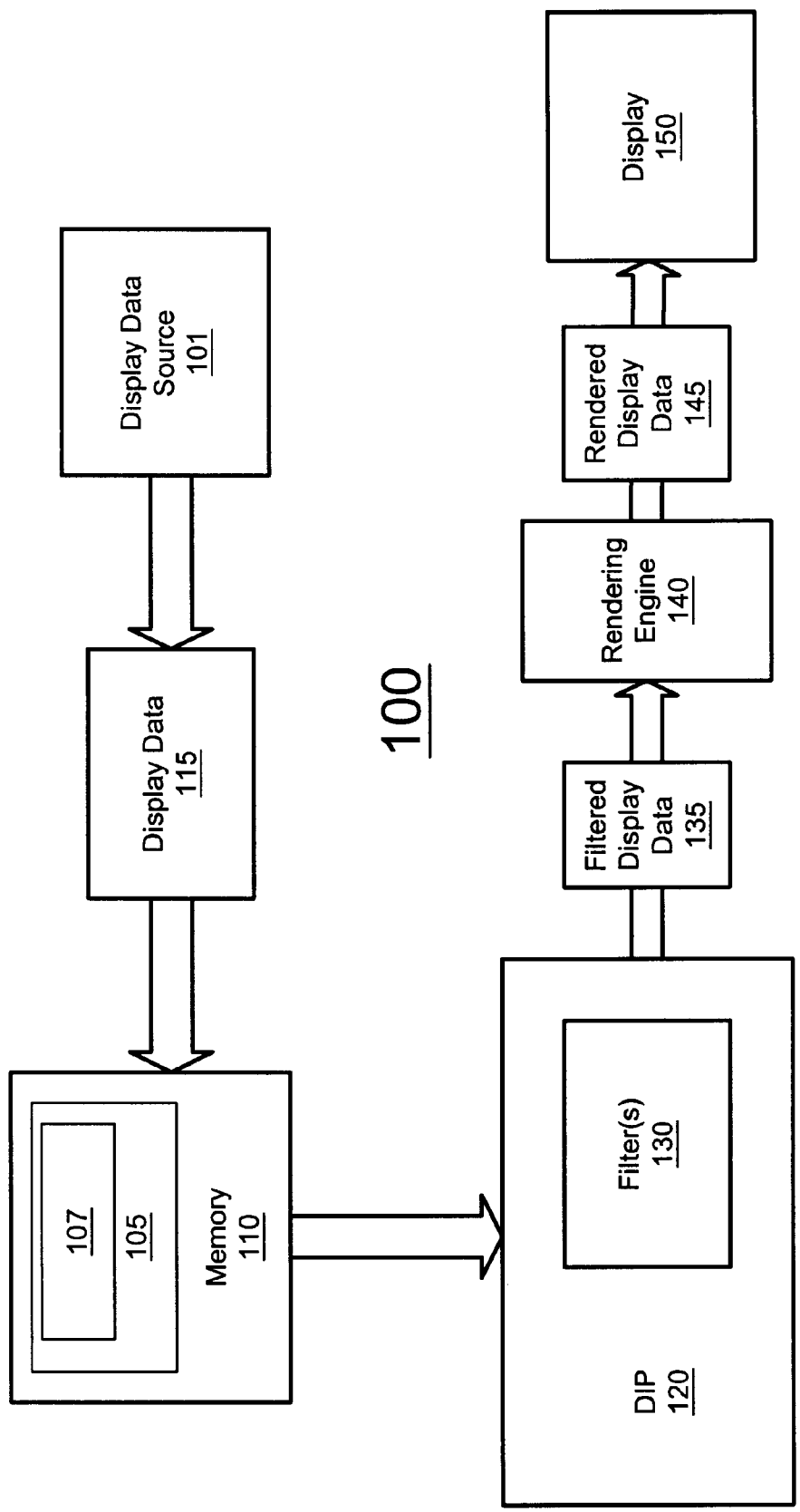
FIG. 1 is a diagram illustrating a display system according to at least one embodiment of the present invention.

Referring now to FIG. 1, a display system is illustrated according to at least one embodiment of the present invention. Display system 100 includes memory 110, digital image processor (DIP) 120, rendering engine 140, and display 150. In at least one embodiment, DIP 120 includes one or more filters 130. It will be appreciated that one or more elements of display system 100 may be implemented in software, firmware, or hardware.

In at least one embodiment, memory 110 receives and/or stores display data 115 from display data source 101. Memory 110 can include random access memory, read only memory, video memory, a buffer, a storage device, and the like. Display data 115 can include one or more display frames, or one or more portions of one or more display frames. For example, display data 115 could include data representative of a web page displayed on a display device. Display data source 101 can include devices that produce and/or output display data, such as a computer, a digital versatile disc (DVD) player, a laserdisc, a video compact player (VCP), and the like. Display data source 101 can also include television or other display signals transmitted and received over a variety of mediums, such as cable, satellite, and broadcast. Memory 110 can further include digital image processing (DIP) instructions 105, which are described in greater detail herein.

DIP 120, in one embodiment, retrieves or receives display data 115 and/or DIP instructions 105 from memory 110. In one embodiment, DIP 120 is implemented as hardware or firmware. For example, DIP 120 could include a peripheral connect interface (PCI) card, DIP 120 could be located on a computers motherboard, or DIP 120 could be implemented as a digital signal processor (DSP) on a computer's central processing unit (CPU). In another embodiment, DIP 120 is implemented as software instructions. For example, DIP 120 could include a subset of a plurality of instructions of a graphics display program. In yet another embodiment, DIP 120 is implemented using a combination of software instructions and hardware or firmware.

In one embodiment, DIP 120 processes display data 115 according to DIP instructions 105. In at least one embodiment, DIP instructions 105 include instructions for analyzing display data 115 to find display components with different frequency contents. In one embodiment, DIP instructions 105 include instructions to find and sort display components with different frequency contents using band-based techniques, such as those techniques based on wavelet theory. In another embodiment, DIP instructions 105 include instructions to find and sort display components with different frequency contents using size-based techniques, similar to run-length encoding. Techniques used to determine, sort, and/or process display components based on frequency content are discussed in greater detail with reference to FIGS. 5–8.

DIP instructions 105, in one embodiment, further include one or more filter algorithms 107. DIP 120, in one embodiment, utilizes filter algorithms 107 to filter display data 115. In at least one embodiment, display data 115 is filtered before transmission to display 150 to prevent flickering and/or aliasing, as discussed in greater detail below. In one embodiment, one or more filter algorithms 107 are implemented using filter hardware (filters 130) instead of computer instructions. In at least one embodiment, filter algorithm 107 and/or filter 130 includes vertical filter, such as a polyphase finite impulse response (FIR) filter.

In one embodiment, after processing, such as filtering, display data 115, DIP 120 transmits the data as filtered display data 135 to rendering engine 140. Rendering engine 140 receives filtered display data 135 and then renders display data 135 into a display format (rendered display data 145) compatible with display 150. In one embodiment, rendering engine 140 provides necessary additional data and/or control signals for display 150 to use for display of rendered display data 145. For example, DIP 120 may be implemented on a personal computer while display 150 may include a television. Since most personal computers are designed to display data on a computer monitor, rendering engine 140 is required to render the display data (filtered display data 135) into a format compatible with a television (display 150). In this case, the rendering processes may include the conversion of filtered display data 135 from a digital format to an analog format, the addition of horizontal and vertical synchronization signals, the addition of audio signals, etc.

Display 150 receives rendered display data 145 from rendering engine 140 and displays rendered display data 145 in the appropriate format. Display 150 can include computer monitors, televisions, projections screens, liquid crystal displays (LCDs), and the like. In at least one embodiment, filtered display data 135 is in a format compatible with display 150. In another embodiment, DIP 120 performs the functions of rendering engine 140, and where filtered display data 135 is equivalent to rendered display data 145. It will be appreciated that in either embodiment, the functionality of a separate rendering engine 140 is unnecessary or redundant, and rendering engine 140 may therefore be omitted without departing from the spirit of the present invention.

Figure 2:
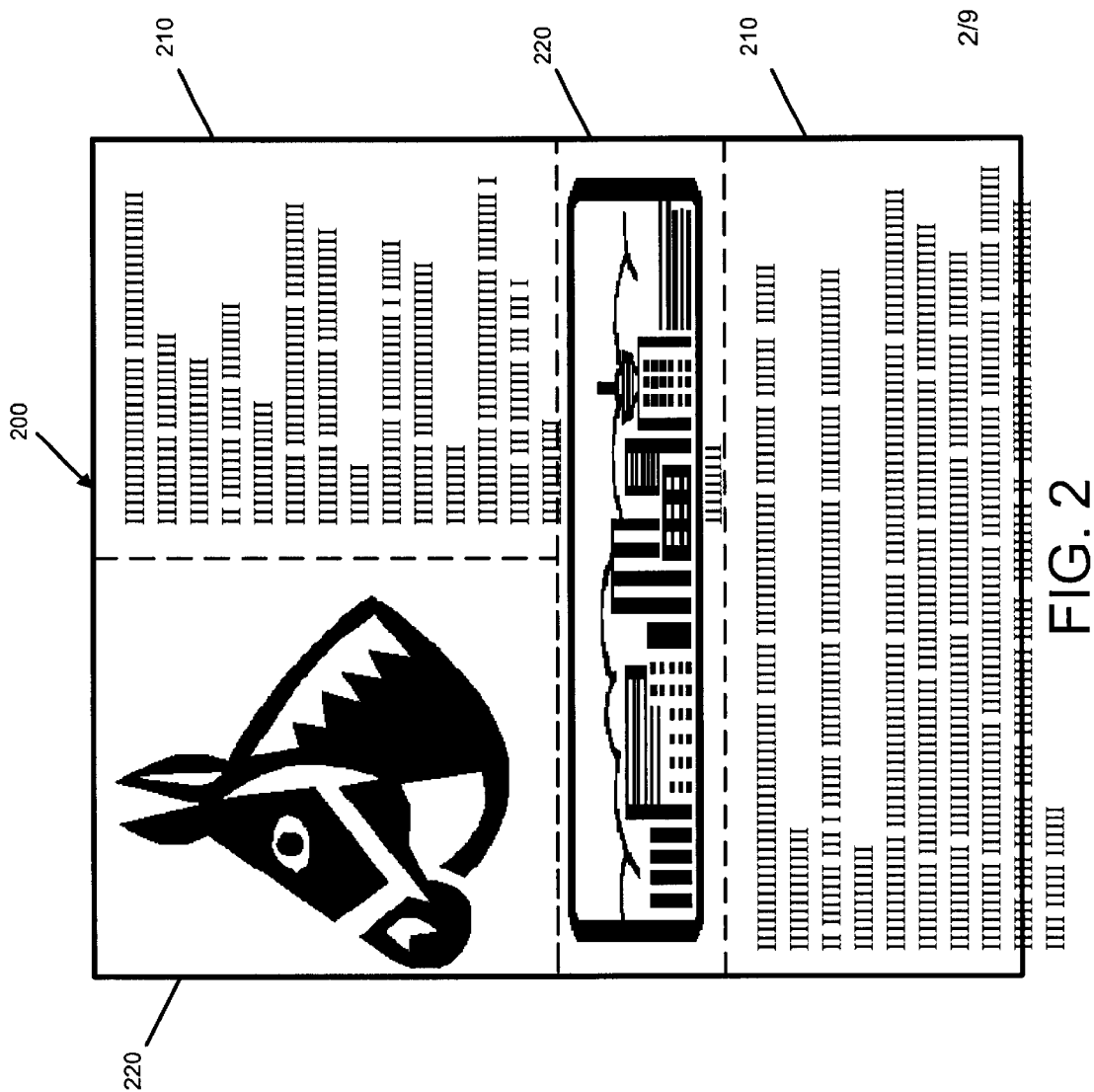
FIG. 2 is a diagram illustrating the structure of a display frame according to at least one embodiment of the present invention.

Referring to FIG. 2, a display frame is illustrated according to at least one embodiment of the present invention. In at least one embodiment, display frame 200 provides a visual representation of display data 115 (FIG. 1). Display frame 200 includes one or more low frequency components 220 and/or one or more high frequency components 210. Although reference to two types of frequency components, high frequency and low frequency, is made herein for ease of illustration, at least one embodiment of the present invention provides for more than two types of frequency components. For example, in one embodiment, display frame 200 includes low frequency components 220, high frequency components 210, and one or more medium frequency components (not shown). Any reference to a system or method utilizing two frequency components also applies to systems and/or methods utilizing more than two frequency components.

As previously discussed, in at least one embodiment, the display data 115 contains one or more display components having varied frequency contents. The term display component refers to a spatial component of display data 115. For example, a display component can include a single pixel, a single horizontal row of pixels, a plurality of rows of pixels, and the like. The term frequency content, as used herein, refers to the change of one or more pixel or component attributes in a given direction, such as across a horizontal line of display frame 200. The pixel or component attribute that may be utilized to describe frequency content can include change in color, change in contrast, change in brightness, frequency of object edges, and the like. For example, in embodiments where display data 115 includes data representative of a black and white image, frequency content can refer to the frequency of change in the color of pixels between black and white across a horizontal line of pixels. For example, if a black pixel is represented by the number 0 and a white pixel is represented by the number 1, a horizontal sequence of pixels such as 000000000001111111111 could be said to have low frequency content when analyzed using size-based techniques, such as those similar to run length encoding, since the color value of the pixels does not change frequently across the horizontal line. However, in one embodiment, the same horizontal sequence of pixels could have a high frequency component due to the rapid change from the '0' value to the '1' value, when analyzed using band-based techniques, such as wavelet-based techniques. Accordingly, the horizontal sequence of pixels could be separated into different frequency components. Similarly, using size-based techniques, a horizontal sequence of pixels such as 010101010101010101 could be determined to have high frequency content since the color value of the pixels changes frequently across the horizontal line. Likewise, band-based analysis techniques could determine that the same sequence has high frequency content due to the plurality of rapid change from '0' values to '1' values. Frequency content analysis techniques, such as band-based techniques and size-based techniques, are discussed in greater detail below.

In other embodiments, the display data 115 contains data representative of color images, grayscale images, etc. In these embodiments, the frequency of change in brightness and/or contrast can be used to determine frequency content, as well as change in color, as discussed in the black and white example. In at least one embodiment, the threshold, or delineation, between frequency content bands, such as a low frequency content and a high frequency content, can be determined and set by a user, determined and set by display system 100, indicated by display data 115, etc. As discussed in greater detail below, in one embodiment, the threshold is related to the Nyquist rate of display system 100.

In one embodiment, a display component (frequency components 210, 220) is an object or spatial region of display frame 200 having the same or similar frequency content. Display components having low frequency content are said to be low frequency components (low frequency components 220), whereas display components having high frequency content are said to be high frequency components (high frequency components 210). For example, many types of graphics, such as clipart, pictures, etc, and large spatial regions of display frame 200 with the same or similar colors or brightness are said to have a low frequency content, whereas small display components, such as computer text, are said to have high frequency content. As discussed previously, it will be appreciated that other logical divisions of frequency content other than low and high may be used to describe the frequency content of display components. For example, display components (frequency components 210, 220) may fall into more than two frequency divisions, such as low, medium, or high frequency content.

Figure 3:
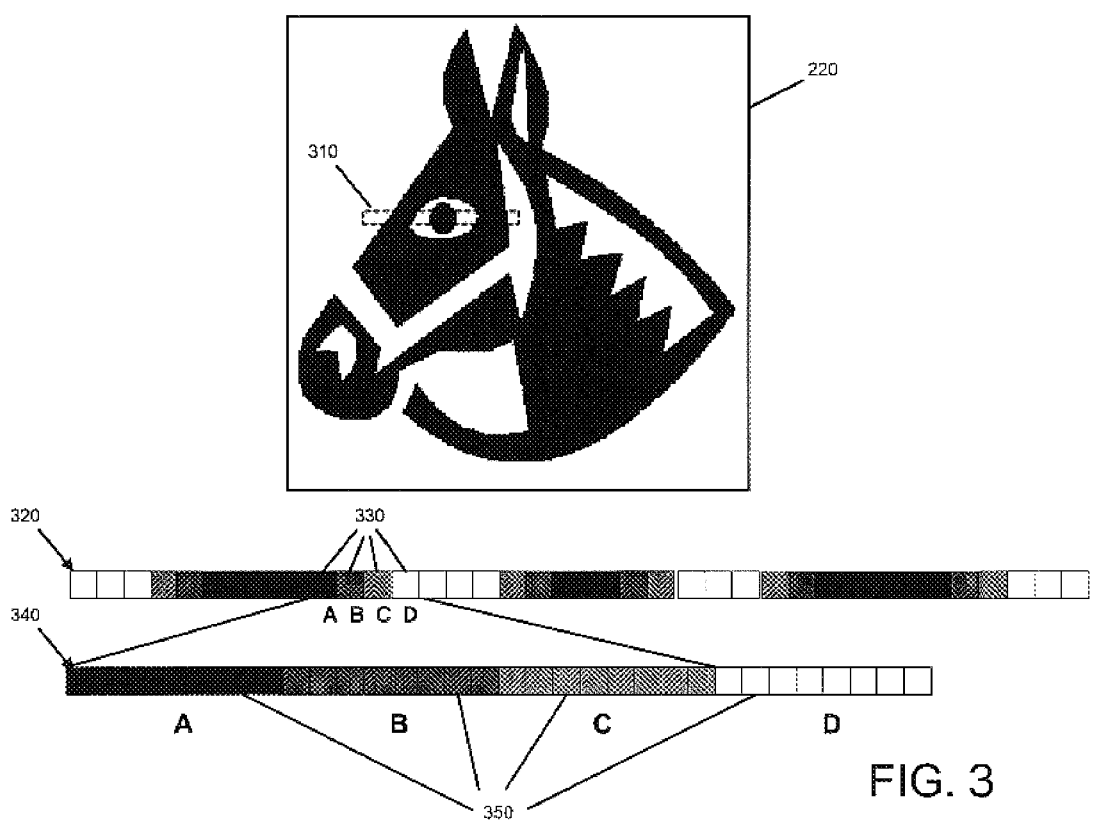
FIG. 3 is a diagram illustrating the structure of a display component having low frequency content according to at least one embodiment of the present invention.

Referring to FIG. 3, low frequency component 220 of a display frame is illustrated in greater detail according to at least one embodiment of the present invention. Component row 310 is a sequence of pixels in an arbitrary row of low frequency component 220. Block row 320 represents a magnification of component row 310 and includes a plurality of pixel blocks 330. Pixel sequence 340 represents a magnified sequence of a number of pixel blocks 330.

As discussed previously, low frequency component 220 represents an object or spatial region of display frame 200 (FIG. 2) having low frequency content. Component row 310 illustrates a sequence of pixels of an arbitrary row. By magnifying component row 310 into block row 320, a sequence of pixel blocks 330 become apparent, where each pixel block 330 represents a plurality of pixels. For illustration purposes, pixel block 330 is represented by the average color composition of the associated plurality of pixels. As demonstrated by block row 320, the properties of the pixels of component row 310 change gradually relative to a defined threshold. For example, four pixel blocks 330 are used for transition from a black pixel block (position A) to a white pixel block (position D), with a dark gray (position B) and light gray (position C) pixel block in between.

The gradual change is even more pronounced when viewed at an increased magnification on a pixel-by-pixel basis in pixel sequence 340. For example, each of the four pixel blocks 330 of the pixel block sequence A, B, C, D include eight associated pixels 350. In this case, the transition from a pure black pixel to a pure white pixel occurs over a length of 18 pixels 350. In one embodiment, if the number of pixels used to transition from black to white is less than a threshold defined by a user or display system 100, as described previously, the pixel block 330 sequence A, B, C, D is defined as a high frequency component. In FIG. 3, the entire display component (low frequency component 220) is considered to have the same transition frequency characteristics, and is therefore considered a low frequency component.

Figure 4:
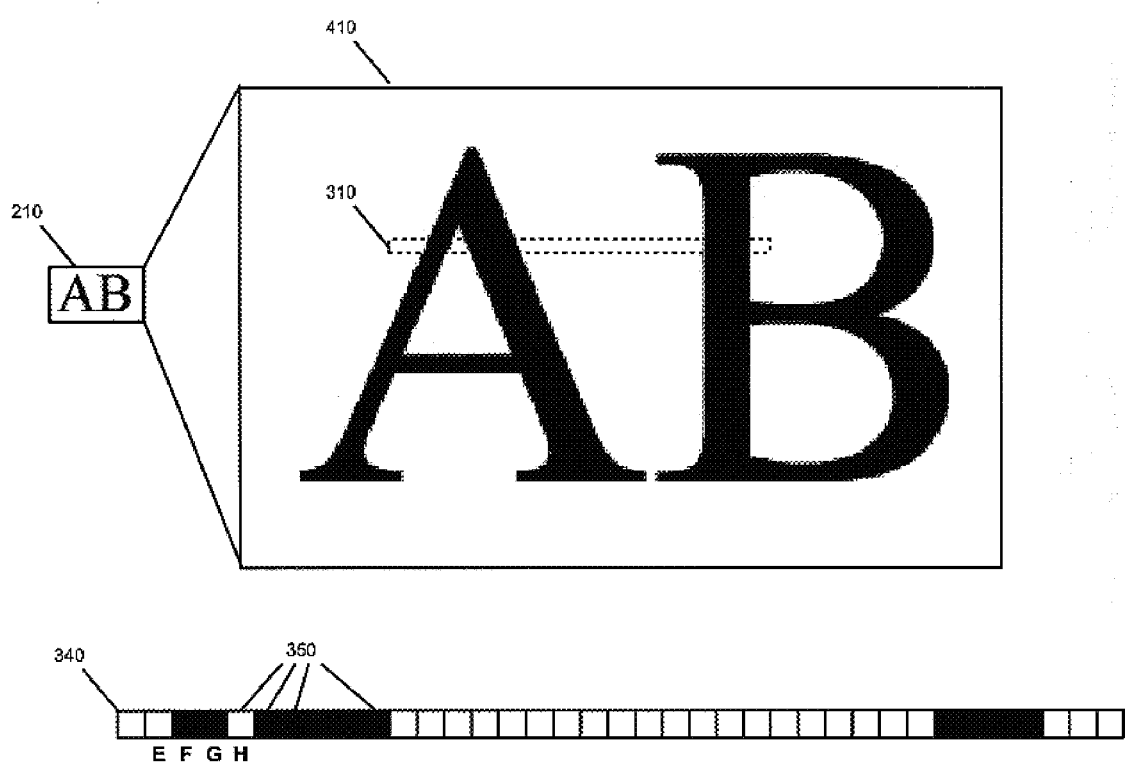
FIG. 4 is a diagram illustrating the structure of a display component having high frequency content according to at least one embodiment of the present invention.

Referring next to FIG. 4, high frequency component 210 is illustrated in greater detail according to at least one embodiment of the present invention. High frequency component 210 is magnified and illustrated by magnified high frequency component 410. Component row 310 is a sequence of pixels in an arbitrary row of high frequency component 210 and pixel sequence 340 represents a magnified sequence of a number of pixels 350 of component row 310.

High frequency component 210 represents an object or spatial component of display frame 200 (FIG. 2) having high frequency content, such as displayed computer text. Component row 310 illustrates a sequence of pixels of an arbitrary row. By magnifying component row 310 into pixel row 340, a sequence of pixels 350 becomes visible. As demonstrated by pixel row 340, the properties of pixels 350 of component row 310 change frequently relative to a defined threshold. For example, there is an abrupt change from white pixel 350 (position E) to black pixel 350 (position F), and another abrupt change from black pixel 350 (position G) to white pixel 350 (position H). In effect, at least a portion of component row 310 has a transition from a white pixel 350 (position E) to a black pixel 350 (position F), and vice versa, in a sequence of two pixels. In one embodiment, if the number of pixels used this transition is less than a threshold defined by a user or display system 100 (FIG. 1), as described with reference to FIG. 3, the pixel sequence EFGH is defined as a high frequency component. In FIG. 4, the entire display component (high frequency component 210) is considered to have the same transition characteristics, and is therefore considered a high frequency component. Although FIGS. 3 and 4 illustrate the frequency content of low frequency component 220 and high frequency component 210 using a change in the color of the pixels (or brightness if components 210, 220 are a black and white images), other pixel characteristics may be used to determine the frequency content, as discussed previously. For example, the change in contrast across a horizontal row of pixels (component row 310) may be used to determine a display component's frequency content.

Figure 5:
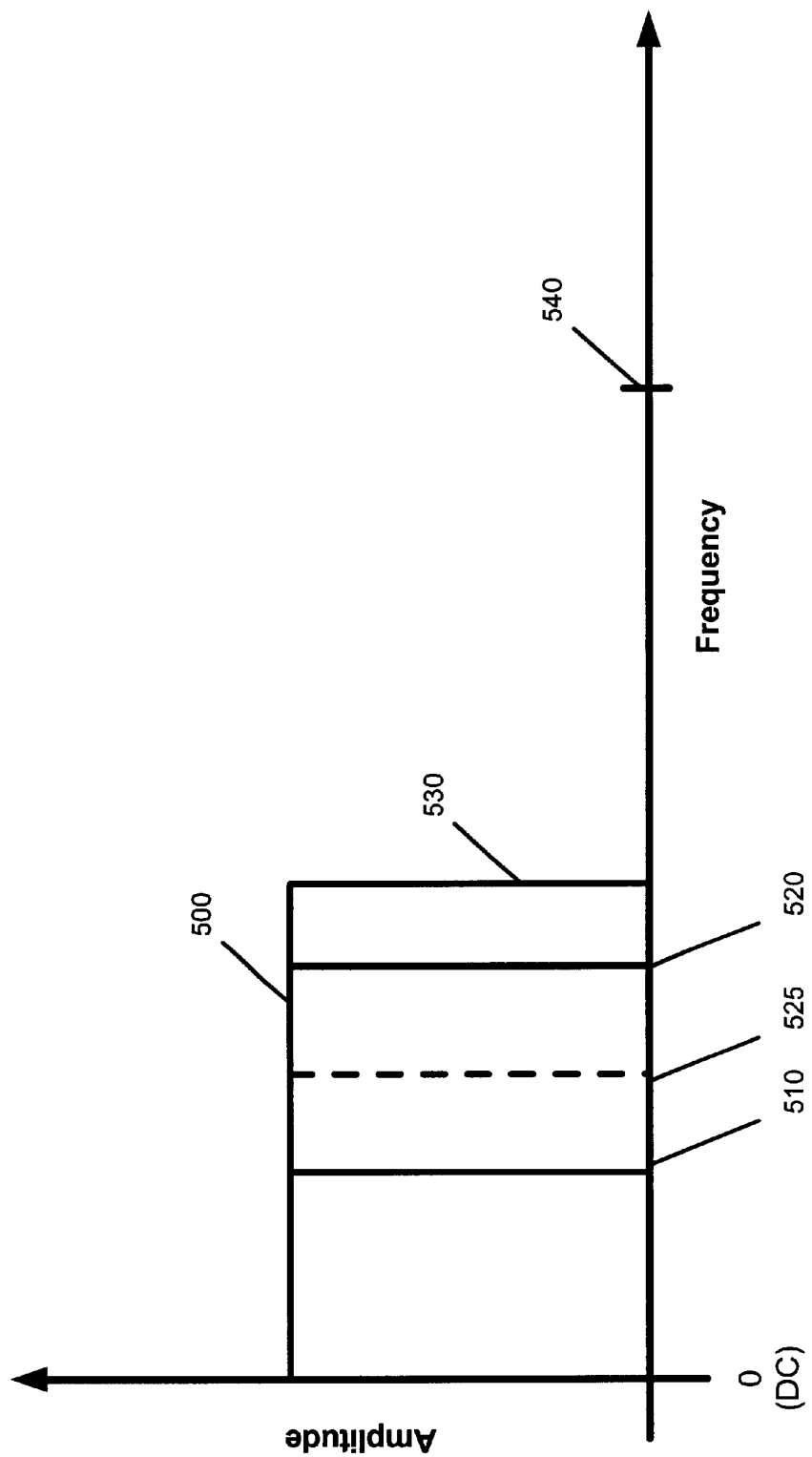
FIG. 5 is a diagram illustrating the frequency response of an ideal filter according to at least one embodiment of the present invention.

Recall that display frame 200 (FIG. 2) is separated into display components (components 210, 220) (FIG. 2) and associated with a particular frequency content, or sub-band, by display system 100 (FIG. 1). Display system 100 filters the display components (subsets of display data 115) using filter algorithms 107 and/or filters 130 (FIG. 1). In at least one embodiment, filtering includes applying a low pass filter to remove components having a frequency higher than a particular cutoff frequency. The low pass filter cutoff frequency is determined based on the sub-band or frequency content associated with a particular display component. Referring next to FIG. 5, the frequency response of an ideal low pass filter according to at least one embodiment of the present invention is illustrated relative to display sampling rate 540, Nyquist cutoff 530, high frequency content cutoff 520, and low frequency cutoff 510. It will be appreciated that although an ideal low pass filter is illustrated for ease of discussion, the frequency response of a real low pass filter may exhibit imperfections such as overshoot, poor stopband attenuation, slow step response, and the like.

In at least one embodiment, frequency content of display data 115 is determined in the horizontal direction, whereas low pass filtering of display data 115 is performed in the vertical direction. For example, a horizontal row of pixels could be analyzed to determine frequency content of the row of pixels. The horizontal row of pixels could be separated into one or more frequency components based on the components horizontal frequency content. However, after determining the frequency content of the frequency components of the horizontal row of pixels, the frequency components are filtered vertically at different cutoff frequencies. Methods of determining frequency content are discussed below with reference to FIGS. 7 and 8.

According to the Nyquist sampling theorem, a continuous signal (display data 115) (FIG. 1) may be properly sampled only if the sampling rate is at least twice as high as the highest frequency contained in the continuous signal. The sampling rate of a display (display 150) (FIG. 1) is indicated by display sampling rate 540. Half of the sampling rate of a display, the Nyquist rate, is indicated by Nyquist cutoff 530. If a continuous signal contains frequencies above the Nyquist rate (Nyquist cutoff 530), aliasing could be introduced unless the frequencies above the Nyquist rate are filtered out. Accordingly, in one embodiment, the limit of the cutoff frequency of the filter is placed at Nyquist cutoff 530. For example, a National Television Standards Committee (NTSC) compliant television (display 150) has 525 rows (or lines) of resolution. However, only approximately 480 are available to display data, the remaining rows are used to synchronize the television with the video signal. Since the television has 480 rows available, it has a maximum sampling rate (display sampling rate 540) of 480 Hz. According to the Nyquist theorem, the Nyquist rate (Nyquist cutoff 530) is set to half of the display sampling rate, or 240 Hz. As a result, the maximum cutoff frequency of frequency response 500 for a television (display 150) is 240 Hz. Any components of display data 115 with frequency content higher than Nyquist cutoff 530 are filtered out.

Although aliasing may be reduced or eliminated by using a filter with a cutoff frequency at or below Nyquist cutoff 530, flicker may still occur at frequencies around Nyquist cutoff 530. To reduce or eliminate flicker, display data 115 may be filtered in its entirety at a flicker filter cutoff frequency (low frequency cutoff 510). The flicker filter cutoff frequency conventionally is set at one-half of Nyquist cutoff 530, which is one-fourth of display sampling rate 540. Although this technique reduces or eliminates flicker, it often has the undesirable effect of blurring display components since they are displayed at a much-reduced resolution. This blurring may cause small image objects or components, such as text, to become unrecognizable or indiscernible.

In at least one embodiment, low frequency components 220 (FIG. 2) are filtered at low frequency cutoff 510 and high frequency components 210 (FIG. 2) are filtered at high frequency cutoff 520. Low frequency components 220 often have less detail and/or are relatively large, and therefore can be filtered at a low frequency cutoff without becoming unrecognizable. In one embodiment, low frequency cutoff 510 is set at the flicker filter rate, or one-half of Nyquist rate 530. In other embodiments, low frequency cutoff 510 may be set to frequencies higher or lower than the flicker filter rate. If low frequency cutoff 510 is set higher than the flicker filter rate, flicker could be introduced. If low frequency cutoff 510 is set lower than the flicker filter rate, resolution may unacceptably deteriorate.

High frequency components 210 are often relatively small and/or contain more detail. Therefore, it is desirable to filter high frequency components 210 at a higher cutoff frequency (high frequency cutoff 520) than for flicker filtering of low frequency components 220. In one embodiment, high frequency cutoff 520 can vary between low frequency cutoff 510 and Nyquist cutoff 530. Although filtering high frequency components 210 at a rate greater than the flicker filter rate (low frequency cutoff 510) may introduce flicker, the display resolution of high frequency component 210 is increased, making high frequency component 210 more clear and/or recognizable. However, while the amount of flicker may be increased due to the filtering of high frequency components 210 at a rate greater than the flicker filter rate, it has been observed that the eye does not easily detect this flicker when applied to high filtering at a normal viewing distance.

In one embodiment, the balance between introduction of flicker and increased resolution is determined by the frequency content associated with high frequency cutoff 520. In one embodiment, high frequency cutoff 520 is set by a user. In other embodiments, frequency cutoff 520 is set by display system 100 (FIG. 1). For example, display system 100 could analyze display data 115 to determine whether high frequency components 210 include computer text. If display data 115 includes computer text, then display system 100 could set high frequency cutoff 520 at or near Nyquist rate 530. It will be appreciated that high frequency cutoff 520 could be set at a rate greater than Nyquist rate 530. However, this could cause the introduction of aliasing.

Recall that one or more thresholds may be used to determine frequency content of one or more display components. In one embodiment, the thresholds are related to the Nyquist rate (Nyquist rate 530). For example, display components with frequency content greater than half of Nyquist rate 530 could be determined to be high frequency components, whereas display components with frequency content less than half of Nyquist rate 530 could be said to be low frequency components. It will be appreciated that any whole or fractional multiple of Nyquist rate 530 can be used to determine the one or more thresholds. It will also be appreciated that other appropriate methods may be used to determine the one or more thresholds.

As previously discussed, at least one embodiment provides for more than two sub-bands of frequency content for display components. For example, display frame 200 (FIG. 2) could be separated into three sub-bands according to frequency content: low frequency components; medium frequency components; and high frequency components. In this case, the low frequency components could be filtered at low frequency cutoff 510, the medium frequency components could be filtered at medium frequency cutoff 525, and the high frequency components could be filtered at high frequency cutoff 520. Techniques for determining frequency content, or sub-bands, of display components are discussed with reference to FIGS. 7 and 8.

Figure 6:
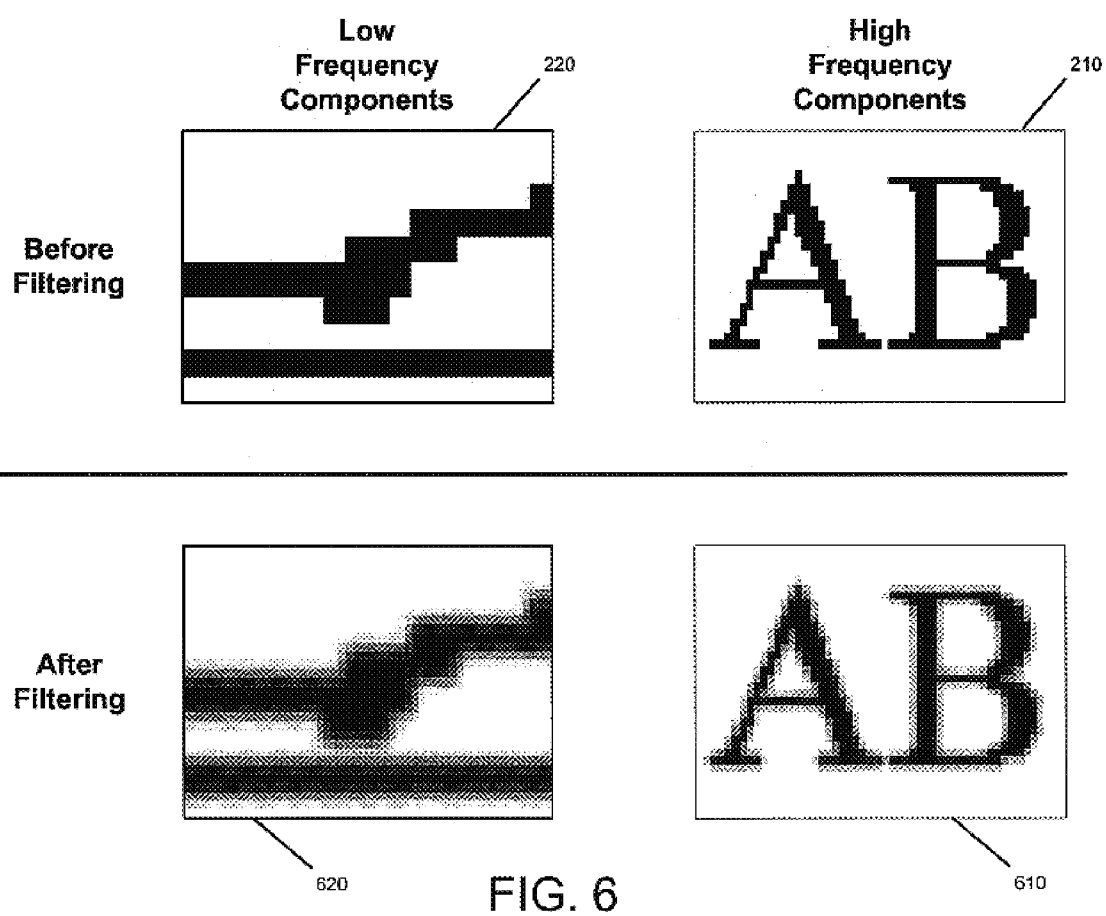
FIG. 6 is a diagram illustrating the effects of filtering on display components according to at least one embodiment of the present invention.

Referring to FIG. 6, the effects of filtering on display components are illustrated according to at least one embodiment of the present invention. In at least one embodiment, different display components having different frequency components are filtered with different cutoff frequencies. As discussed previously, low frequency components 220 can be filtered at a cutoff frequency, such as low frequency cutoff 510 (FIG. 5), which minimizes or eliminates flicker. Although in many cases filtering at such a low frequency may cause significant resolution degradation, the low frequency content of low frequency component 220 could cause the degradation effect to be negligible, allowing the display component represented by low frequency component 220 to be discernible. Filtered low frequency display component 620 illustrates the effects of an arbitrary filter with an arbitrary low cutoff frequency applied to low frequency component 220. Although filtered low frequency display component 620 is significantly blurred, its basic shape and image information remain intact.

While low frequency components 220, in one embodiment, are less susceptible to flicker and may therefore be filtered at a lower rate, display components with higher frequency content may be filtered at a higher cutoff frequency to retain image information or prevent the display components from being unrecognizable when displayed. High frequency component 210 can be filtered at a high cutoff frequency, such as high frequency cutoff 520 (FIG. 5) to prevent lost image information. Filtered high frequency component 610 illustrates the effects of an arbitrary filter with an arbitrary high cutoff frequency applied to high frequency component 210. Since filtered high frequency component 610 is filtered at a higher cutoff frequency than filtered low frequency component 620, filtered high frequency component 610 has increased resolution. However, in at least one embodiment, the high cutoff frequency is set above the flicker filter rate, so some flicker may result. Note that in many cases, the resulting flicker may be unnoticeable to a user sitting at an appropriate distance from display 150 (FIG. 1).

Figure 7:
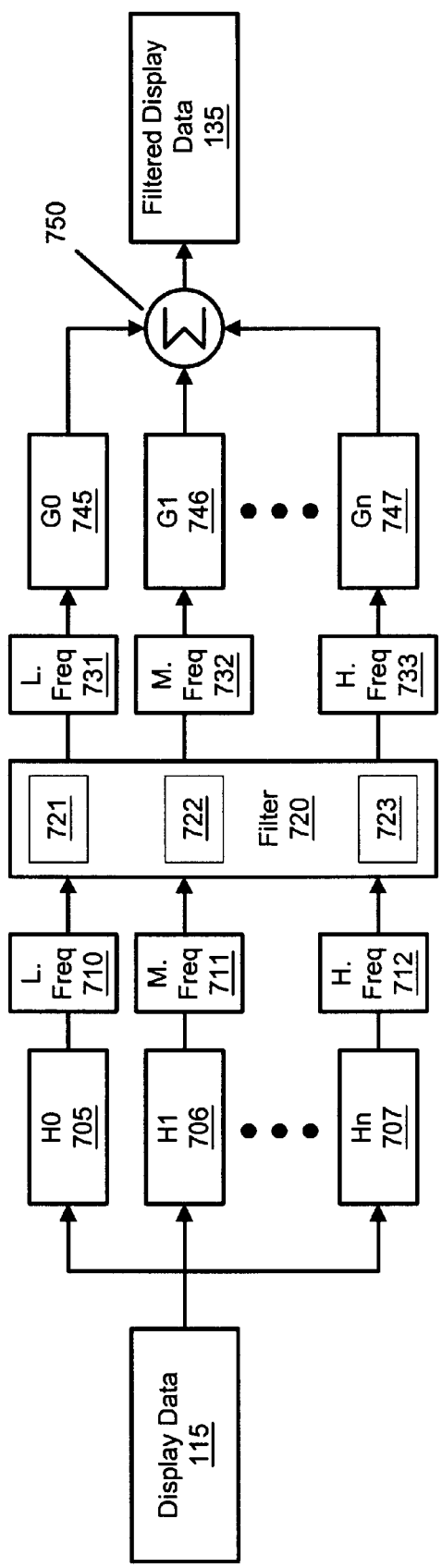
FIG. 7 is a diagram illustrating a method of wavelet based sub-band filtering according to at least one embodiment of the present invention.

Referring next to FIG. 7, a method of filtering display data using band-based techniques is illustrated according to at least one embodiment of the present invention. As discussed previously, in one embodiment, display data 115 is separated into a plurality of sub-bands associated with different levels of frequency content. In at least one embodiment, wavelet-based techniques are used to provide sub-band separation based on frequency content across the horizontal direction. For example, display data 115 can be passed through a plurality of band pass filters 705, 706, 707. Band pass filters 705, 706, 707 separate, or decompose, display data 115 into separate frequency bands (sub-bands) as sub-band data 710, 711, 712. In one embodiment, each of sub-band data 710, 711, 712 represents one or more horizontal display components of display data 115 within a certain frequency content band. For example, display data 115, including low frequency components 220 and high frequency components 210 (FIG. 2), could be passed through two band pass filters (band pass filters 705, 707), one associated with a low frequency sub-band, and one associated with a high frequency sub-band. In this example, low frequency components 220 would be separated into low frequency sub-band data 710, while high frequency components 210 would be separated into high frequency sub-band data 712. Note that additional band pass filters and sub-bands may be utilized. For example, medium frequency band pass filter 706 could separate medium frequency components of display data 115 into medium frequency sub-band data 711.

In one embodiment, the passbands of band pass filters 705, 706, 707 are determined and set by a user. In another embodiment, the passbands are determined and/or set by display system 100 (FIG. 1). For example, if there are two band pass filters 705, 707 utilized by display system 100, display system 100 could set the passband of low band pass filter 705 as 0 Hz to one-half of Nyquist cutoff 530 (FIG. 5) and set the passband of high band pass filter 707 as one-half of Nyquist cutoff 530 to Nyquist cutoff 530. As a result, low frequency sub-band data 710 could include display components with frequency content between 0 Hz and one-half of Nyquist cutoff 530, while high frequency sub-band data 712 could include display components with frequency content between one-half of Nyquist cutoff 530 and Nyquist cutoff 530. This example can also be extended to N band pass filters, where N is an integer. In this case, the frequency range from 0 Hz to Nyquist cutoff 530 could be divided into N equal frequency ranges, with each of the n frequency ranges assigned as the passband of one of N band pass filters 705–707. It will be appreciated that other methods of determining and assigning passbands to band pass filters 705–707 may be used without departing from the spirit or the scope of the present invention. It should also be recognized that use of complimentary band pass filters will produce sub-bands that can be recombined later with better retention of the original image characteristics.

After display data 115 is separated into sub-bands as sub-band data 710–712, in one embodiment sub-band data 710–712 is filtered by filter 720. Recall that display data 115, in one embodiment, is filtered in the vertical direction at a cutoff frequency dependant on frequency content in the horizontal direction. For example, a pixel in a row of pixels is compared to its neighbors to determine its sub-band; however, the filtering is performed in the vertical direction. In other embodiments, display data 115 is filtered in the horizontal direction at a cutoff frequency dependant on frequency content in the vertical direction. Filter 720 can represent one or more filter algorithms 107 utilized by DIP 120 (FIG. 1). Alternately, filter 720 can represents filter 130 (FIG. 1). Filter 720, in one embodiment, includes a filter bank of a plurality of low pass filters 721–723. Low pass filters 721–723 may be implemented in software, firmware, hardware, or a combination therein. In one embodiment, filter 720 and/or low pass filters 721–723 include a filter capable of filtering in the vertical direction, such as a polyphase finite impulse response filter or a comb filter. It will be appreciated that other filter types may be implemented without departing from the spirit or scope of the present invention. In addition, scaling operations can be combined with filtering operations. Such scaling operations would allow the cutoff frequency to be adjusted to reduce aliasing associated with downscaling, as well as reducing flicker.

As discussed previously with reference to FIG. 5, in at least on embodiment display data 115 is filtered with different cutoff frequencies based on frequency content. In one embodiment, filter 720 receives sub-band data 710–712 and passes the data through one of a plurality of low pass filters (filter 720 or low pass filters 721–723), each low pass filter with a different cutoff frequency based on the associated sub-bands frequency content or range. For example, display data 115 could be separated into two sub-bands by two band pass filters 705, 707. In this example, low frequency band pass filter 705 could have a passband of 0 Hz to one-half of Nyquist cutoff 530 (FIG. 5), whereas high frequency band pass filter 707 could have a passband of one-half of Nyquist cutoff 530 to Nyquist cutoff 530. Display data 115 filtered through low frequency band pass filter 705 would form low sub-band data 710 and display data filtered through high frequency band pass filter 707 would form high sub-band data 712. Low sub-band data 710 could be filtered by filter 720 or low pass filter 721 with a cutoff frequency of low frequency cutoff 510 (FIG. 5). In this example, low frequency cutoff 510 could be one-half of Nyquist cutoff 530. In effect, low sub-band data 712 would be filtered to prevent flicker when it is displayed. High sub-band data 712 could be filtered by filter 720 or low pass filter 723 with a cutoff frequency of high frequency cutoff 520, having the effect of minimizing flicker while retaining enough resolution to make high frequency content display components discernible when displayed.

In one embodiment, after sub-band data 710–712 is filtered by filter 720 and/or low pass filters 721–723, it is output as filtered sub-band data 731–733 to one or more reconstruction filters 745–747, each associated with one of band pass filters 705–707. In one embodiment, band pass filters 705–707 and reconstruction filters 745–747 together form an orthonormal basis for display data 115, so that, absent any modification of display data 115 by filter 720 or filters 721–723, display data 115 could be recovered by passing the sub-band data 705–707 back through reconstruction filters 745–747. It will be appreciated that in embodiments where display data 115 (as sub-band data 710–712) is processed by filter 720 or low pass filters 721–723, filtered display data 135 could be altered (such as by frequency attenuation) from display data 115. However, as one of the objects of the present invention is to modify display data 115 to prevent flicker and improve display resolution, this phenomenon may be desired. Note that in at least one embodiment, reconstruction filters 745–747 may be unable to exactly reconstruct display data 115 due to modification of sub-band data 710–712 by filter 720 or low pass filters 721–723. Note that filters 745–745 are not necessarily needed if filters complementary to filters 705–707 prior to the filter 720.

After filtered sub-band data 731–733 is passed through reconstruction filters 745–747, it is combined by summation device 750 into filtered display data 135. In one embodiment, summation device 750 combines the output of reconstruction filters 745–747 using superposition techniques. Summation device 750 may be implemented as software, firmware, or hardware. It will be appreciated that other combination techniques may be used to combine the output of reconstruction filters 745–747.

An added advantage of using wavelet based techniques to separate display data 115 into separate sub-bands is that wavelet based sub-band compression can be performed on display data 115. Display data 115 often includes a vast amount of data representative of one or more images. It is often possible to compress display data 115 with little or no appreciable loss of image resolution using wavelet based sub-band compression techniques known to those skilled in the art. For example, in one embodiment, a discrete wavelet transform (DWT) can be determined for each row of a plurality of rows in display data 115. All values in each row's DWT that are less then a defined threshold can be discarded. Only the DWT coefficients that are above the threshold for each row are utilized, while discarding the DWT coefficients below the threshold. In one embodiment, to reconstruct the original image (or a similar image due to modifications made by filter 720), each row of display data 115 is padded with as many zeros as the number of discarded coefficients in a method similar to run length encoding, and the inverse DWT is used to reconstruct each row of the original image. In other embodiments, other sub-band compression techniques are utilized, such as entropy encoding, zero-tree encoding, Huffman encoding, and the like.

Figure 8:
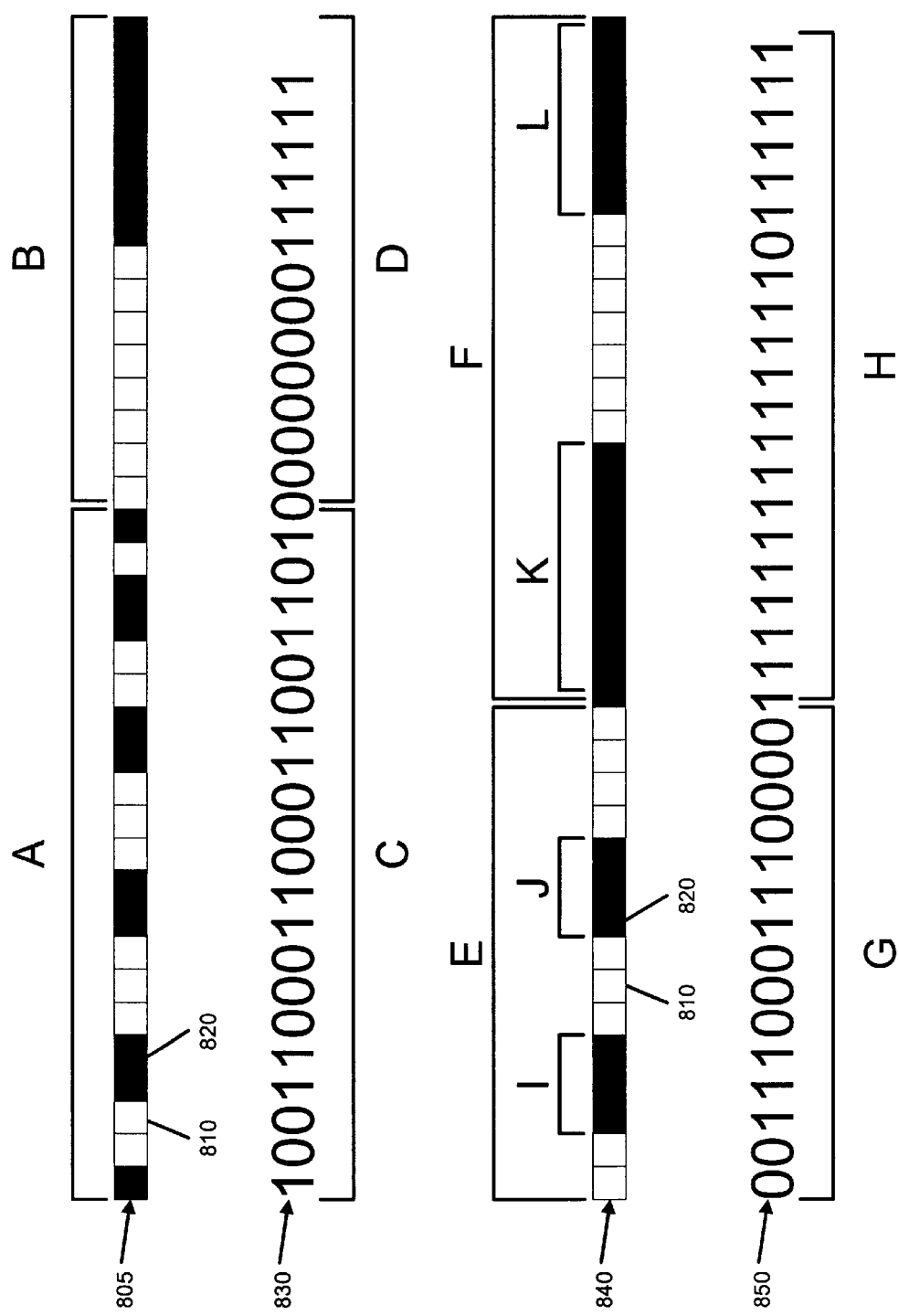
FIG. 8 is a diagram illustrating various methods of determining frequency content according to at least one embodiment of the present invention.

Referring next to FIG. 8, two methods for determining frequency content using size-based techniques are illustrated according to at least one embodiment of the present invention. As discussed previously, at least one embodiment of the present invention provides for a method of filtering a plurality of display components at different cutoff frequencies related to frequency content. A wavelet based technique of separating display data 115 (FIG. 1) into sub-bands based on frequency content according to one embodiment was discussed with reference to FIG. 7. In other embodiments, other size-based methods of determining frequency content are used. Although the following methods of separation of display data 115 into various sets of display components based on frequency are not based on wavelet techniques, the illustrated methods can use filters 720 including low pass filters 721–723 (FIG. 7), whose functions and characteristics were discussed previously, in a similar manner.

In one embodiment, frequency content is determined based on a change in color. Pixel row 805 includes a horizontal row of pixels 810, 820 of display data 115 (FIG. 1). In pixel sequence A, the pixels change frequently between white pixels 810 and black pixels 820. Unlike wavelet based techniques, which, in one embodiment, determine frequency content by the rate of change in one or more values of a sequence of pixels, the illustrated method determines frequency content based on how frequent a change in pixel characteristics occurs, rather than how fast. If this change in pixel characteristics is more frequent than a specified threshold, pixel sequence A could be associated with high frequency component 210 (FIG. 2) and filtered accordingly, as discussed previously with reference to FIG. 5. Similarly, if pixel sequence B has a color change frequency below the specified threshold, pixel sequence B could be associated with low frequency component 220, and filtered accordingly. In at least one embodiment, a plurality of different thresholds is used to determine a plurality of frequency components for a number of pixel sequences.

In at least one embodiment, frequency content of pixel row 805 is determined using display system 100 (FIG. 1). For example, pixel row 805 could be represented in display system 100 as black and white (B&W) binary sequence 830, with the binary number 1 representing black pixel 820, and binary number 0 representing white pixel 810. One or more elements of display system 100, such as DIP 120 (FIG. 1) could then process B&W binary sequence 830 to determine frequency content. As in previous example, since the change between 0's and 1's in binary sequence C is high relative to a determined threshold, display system 100 associates binary sequence C with high frequency component 210, and as binary sequence D changes less frequently, it is associated with low frequency component 220.

Another method for determining frequency content used in at least one embodiment is to analyze a horizontal row for one or more edges of objects in the row. The object's horizontal length in pixels is determined, and frequency content for the object is determined based on the pixel length in relation to a determined threshold. For example, the dot on an "i" in computer text may have a horizontal pixel length less than a determined threshold, and could be processed as high frequency component 210 (FIG. 2). Alternately, a dash "-" in computer text may have a horizontal length greater than the determined threshold, and could be processed as low frequency component 220 (FIG. 2). Edge pixel row 840 includes a horizontal row of pixels 810, 820 of display data 115 (FIG. 1). In one embodiment, leading edges of object in edge pixel row 840 are detected when a pixel sequence transitions from white pixel 810 to black pixel 820, and following edges are detected when a pixel sequence transitions from black pixel 820 to white pixel 810. The length of the object is then determined by counting the number of pixels between a given leading edge and the subsequent following edge. The frequency content of the pixel sequence is then determined based on the pixel length of an object in relation to a defined threshold. For example, it could have been determined by a user or display system 100 (FIG. 1) that a length of four pixels would be an adequate threshold for frequency content purposes. In this case, pixel sequence E includes objects I, J with pixels lengths of three, which are less than the threshold length, so pixel sequence E could be associated with high frequency component 210 and filtered accordingly. However, pixel sequence F includes objects K, L with horizontal pixel lengths of eight and six, respectively. Since the horizontal pixel lengths are greater than the determined threshold of four pixels, pixel sequence F could be associated with low frequency component 220 and filtered accordingly. Note that the sequence of white pixels between object K and object L may also be considered a frequency component, and be analyzed and filtered as such.

As discussed with reference to B&W binary sequence 830, edge pixel row 840 could be represented in display system 100 (FIG. 1) as B&W edge binary sequence 850. In one embodiment, one or more elements of display system 100, such as DIP 120 (FIG. 1) could then process B&W edge binary sequence 850 to determine frequency content. For example, DIP 120 could search B&W edge binary sequence 850 for leading edges represented by the sequence "01" and a subsequent following edge represented by the sequence "10". DIP 120 could then count the number of 1's in sequence between the leading and following edges and sort into different frequency components based on a determined threshold pixel length. For example, binary sequence G has two sets of leading and following edges. DIP 120 could count the number of 1's between the sets of edges and determine that binary sequence G can be associated with high frequency content. Similarly, binary sequence H could be associated with a low frequency content.

Note that in at least one embodiment, a plurality of different thresholds is used to determine a plurality of frequency components for a number of pixel sequences. It will be appreciated that although the illustrated methods utilize pixel characteristics of black and white images, the illustrated methods may also be used with other pixel characteristics of color images, such as change in contrast, change in color, change in brightness, and the like. It will also be appreciated that although one band-based technique and two size-based techniques for determining frequency content are illustrated, other methods may be used without departing from the spirit or the scope of the present invention.

Figure 9:
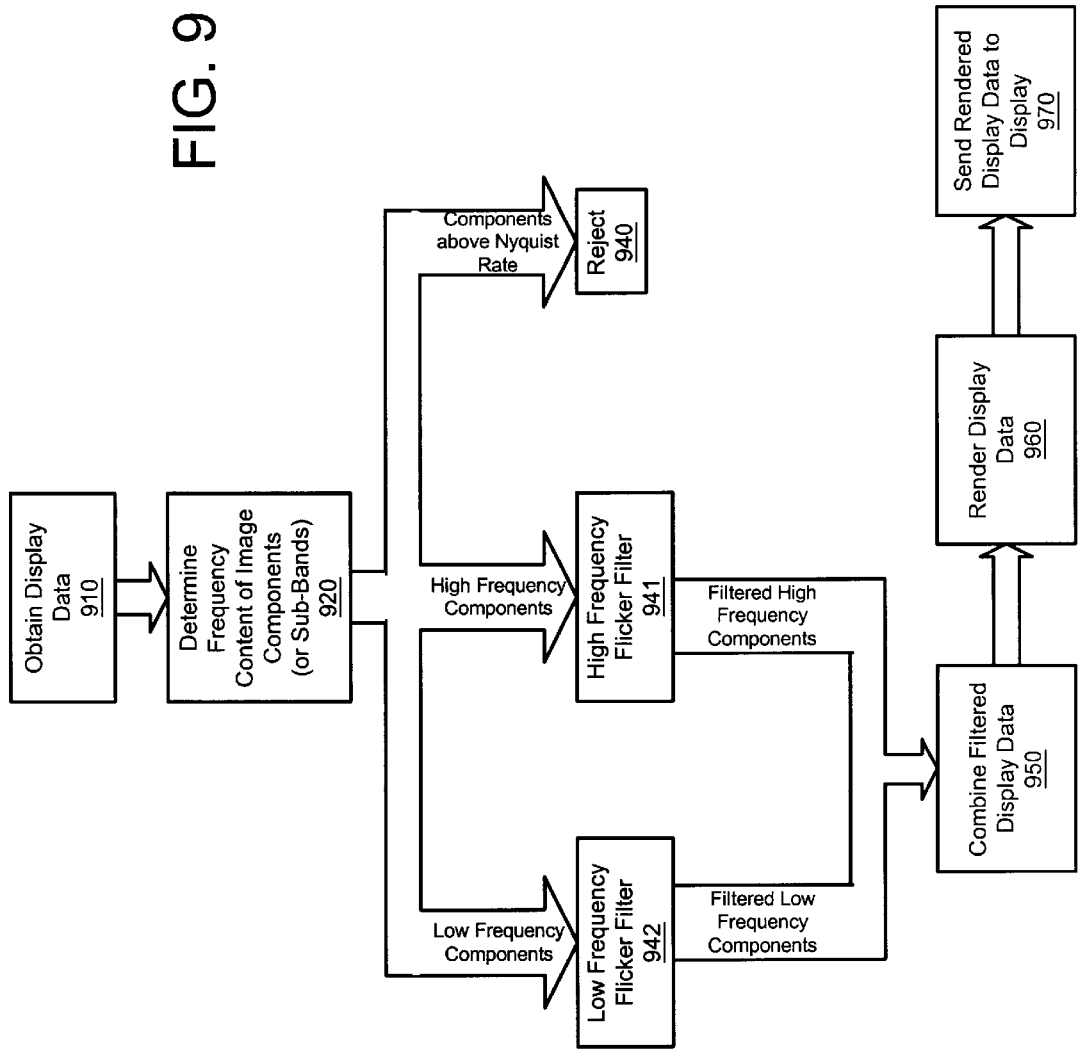
FIG. 9 is a flowchart illustrating a method of filtering display data according to at least one embodiment of the present invention.

Referring next to FIGS. 1 and 9, a method for improved filtering is discussed according to at least one embodiment of the present invention. The method initiates at step 910 with display system 100 obtaining display data 115 from display data source 101. Display data source 101 could include a DVD player, a VCP, a television signal, a computer, and the like. Display data 115 could be transmitted to display system 100 as digital data, such as a motion picture experts group (MPEG) file, or as analog data, such as a broadcast television signal. In one embodiment, step 910 further includes converting analog display data into digital display data using an analog-to-digital converter (ADC). Note that in one embodiment, display system 100 may add additional data to display data 115 received from display data source 101. For example, display system 100 could include a desktop computer and display data source 101 could include a web page server connected to display system 100 over a network connection. In this case, display data 115 could include web page data, such as graphics, hypertext markup language (HTML) code, etc. Display system 100 could add additional information to display data 115, such as graphical user interface display data, processed HTML code, and the like. In one embodiment, step 910 further includes the step of storing display data 115 in memory 110. DIP 120, as discussed previously, could then retrieve display data 115 from memory 110 as needed. In another embodiment, display data 115 is transmitted directly to DIP 120.

After obtaining display data 115, in step 920, display data 115 is analyzed and/or processed to determine frequency content. In one embodiment, frequency content in the horizontal direction is determined using one or more band-based techniques, such as wavelet-based techniques, as discussed with reference to FIG. 7. These sub-band separation techniques may be implemented as instructions in a computer program stored in memory 110 or in DIP 120, such as a subset of instruction of DIP instructions 105. In another embodiment, the sub-band separation techniques are implemented as hardware or firmware in display system 100. For example, DIP 120 could further include a programmable logic array (PLA) (not shown) that has been programmed to perform a sub-band separation algorithm.

In another embodiment, size-based techniques, similar to run length encoding, are used to determine frequency content, as discussed with reference to FIG. 8. As with the sub-band separation techniques previously discussed, these methods may be implemented as software, hardware, or firmware on display system 100. It will be appreciated that other methods of determining frequency content and separating display data 115 into sub-bands may be used without departing from the scope of the invention.

After the frequency content of display data 115 is determined, display data 115 is separated, logically or physically, into appropriate frequency components. As discussed previously with reference to FIG. 5, frequency components with a frequency content greater than Nyquist cutoff, herein referred to as super-Nyquist components, could introduce aliasing, so in at least one embodiment, the super-Nyquist components are filtered out or rejected in step 940. In one embodiment, the super-Nyquist components are rejected using an antialiasing filter (not shown) implemented as software or hardware in display system 100.

In step 941, high frequency components 210 are filtered as discussed previously with reference to FIGS. 5–7. In at least one embodiment, high frequency components 210 (FIG. 2) are filtered with a cutoff frequency (high frequency cutoff 520) intended to minimize flicker while providing adequate resolution so that high frequency components 210 are discernable. In step 942, low frequency components 220 (FIG. 2) are filtered as discussed previously. In at least one embodiment, low frequency components 220 are filtered at the conventional flicker filter rate (low frequency cutoff 510) to maximize reduction in flicker or eliminate flicker. In other embodiments, a plurality of frequency components are filtered at a plurality of different cutoff frequencies according to the desired characteristics of the associated frequency components, such as reduced flicker or improved resolution. As discussed previously, in one embodiment, the filtering in steps 941, 942, is performed in the vertical direction at a cutoff frequency determined by frequency content in the horizontal direction. In another embodiment, the filtering in steps 941, 942 is performed in the horizontal direction at a cutoff frequency determined by frequency content in the vertical direction. It will be appreciated that with many filtering algorithms, there is a tradeoff between reduced flicker and image resolution.

In step 950, the plurality of filtered frequency components (filtered frequency components 610, 620) are combined into filtered display data 135. Filtered frequency components 610, 620 may be combined using any appropriate method, such as superposition. In one embodiment, filtered frequency components 610, 620 are combined by DIP 120 and transmitted to rendering engine 140 as filtered display data 135. In another embodiment, filtered frequency components 610, 620 are sent uncombined as filtered display data 135 to rendering engine 140, were rendering engine 140 can combine filtered display data 135. It will be appreciated that at least one of the illustrated filtering algorithms implemented in software does not require a physical separation of display data 115 to filter the frequency components, so in at least one embodiment, step 950 where filtered frequency components 610, 620 can be omitted.

In at least one embodiment, filtered display data 135 is processed and/or formatted further by rendering engine 140 in step 960. Processes performed by rendering engine 140 can include combining filtered display data 135 with additional data, such as graphical user interface data, additional filtering of filtered display data 135, error detection and correction, and the like. Step 960 can further include the step of formatting filtered display data 135 into a format compatible with display 150. For example, rendering engine 140 could include a digital-to-analog converter (DAC) that converts filtered display data 135 from a digital form to an analog signal. Rendering engine 140 could also add any additional data or information needed to the signal, such as the horizontal and vertical sync pulses found in video signals sent to NTSC compliant televisions. The method terminates with step 970, where rendered display data 145 is transmitted to display 150. Rendered display data may be transmitted using a bus, a cable, a wireless connection, etc. Alternatively, in one embodiment, rendered display data 145 can be stored on a storage device. For example, rendered display data 145 could be stored on a hard disc drive, burned on a DVD, etc.

The various functions and components in the present application may be implemented using an information handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

In the preceding detailed description of the figures, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:

receiving a set of display data;

identifying a first portion of the display data having a first spatial component;

identifying a second portion of the display data having a second spatial component;

filtering the first portion of the display data to reduce flicker by a first amount; and filtering the second portion of the display data by a second amount, wherein the first amount reduces flicker to a greater extent than the second amount.

2. The method as in claim 1, wherein identifying the first and second portions of the display data include determining a frequency of contrast changes in portions of the display data.

3. The method as in claim 1, wherein identifying the first and second portions of the display data include determining a frequency of color changes in portions of the display data.

4. The method as in claim 1, wherein identifying the first and second portions of the display data are performed using a size-based technique.

5. The method as in claim 4, wherein the size-based technique includes a run length type encoding technique.

6. The method as in claim 1, wherein identifying the first and second portions of the display data are performed using a band-based technique.

7. The method as in claim 6, wherein the band-based technique includes a wavelet-based sub-band separation technique.

8. The method as in claim 7, further including compressing the first and second portions of the display data using sub-band compression techniques.

9. The method as in claim 1, wherein:

filtering the first portion includes using a first low-pass filter having a first cutoff frequency; and filtering the second portion includes using a second low-pass filter having a second cutoff frequency different from the first cutoff frequency.

10. The method as in claim 9, wherein identifying the first portion of the display data is performed in a first direction and filtering the first and second portion are performed in a second direction.

11. The method as in claim 10, wherein the first direction is orthogonal to the second direction.

12. The method as in claim 11, wherein the first direction is horizontal.

13. The method as in claim 1, further including:

identifying at least a third portion of the display data having a third spatial component different from the first spatial component and the second spatial component; and filtering the at least a third portion of the display data by a third amount, where the second amount reduces flicker to a greater extent than the third amount.

14. The method as in claim 1, wherein:

filtering the first set includes the use of a low-pass filter with a first cutoff frequency; and filtering the second set includes the use of a low-pass filter with a second cutoff frequency.

15. The method as in claim 1, wherein filtering is performed in a second direction.

16. The method as in claim 15, wherein the first direction is orthogonal to the second direction.

17. The method as in claim 16, wherein the first direction is horizontal.

18. A method comprising:
    associating a first display component of a plurality of display components with a first set based on an attribute of the first display component in a first direction;
    associating a second display component of the plurality of display components with a second set based on an attribute of the second display component in the first direction;
    filtering the first set at a first frequency range to reduce flicker on a display;
    filtering the second set at a second frequency range, where the second frequency range is higher than the first frequency range;
    associating a third display component of the plurality of display components with a third set based on an attribute of the third display component in the first direction; and
    filtering the third set at a third frequency range, wherein the third frequency range is higher than the first frequency range and lower than the second frequency range.

19. The method as in claim 18, wherein the plurality of display components are represented by one or more data sets.

20. The method as in claim 19, wherein the second set is less susceptible to flicker.

21. The method as in claim 18, wherein filtering is performed in a second direction, different from the first direction.

22. The method as in claim 18, wherein the attribute of the first display component and the attribute of the second display component are determined using a band-based technique.

23. The method as in claim 22, wherein the band-based technique includes a wavelet-based sub-band separation technique.

24. The method as in claim 18, wherein the attribute of the first display component and the attribute of the second display component are determined using a size-based technique.

25. The method as in claim 24, wherein the size-based technique includes:
    comparing a dimension of the first display component to a threshold; and
    comparing a dimension of the second display component to the threshold.

26. The method as in claim 25, wherein the threshold is related to the Nyquist rate of the display.

27. The method as in claim 25, wherein the dimensions of the attributes of the first and second display components are determined using changes in contrast.

28. The method as in claim 25, wherein the dimensions of the attributes of the first and second display components are determined using changes in color.

29. The method of claim 18, further including:
    scaling the first and second display components; and
    wherein filtering the first set further includes filtering the first set to reduce aliasing associated with downscaling.

30. A computer readable medium tangibly embodying a program of instructions, said program of instructions including instructions to manipulate a data processor to:
    receive a set of display data;
    identify a first portion of the display data having a first spatial component;
    identify a second portion of the display data having a second spatial component greater than the first spatial component;
    filter the first portion of the display data to reduce flicker by a first amount; and
    filter the second portion of the display data by a second amount, wherein the first amount reduces flicker to a greater extent than the second amount.

31. The computer readable medium as in claim 30, wherein identifying the first and second portions of the display data includes determining a frequency of color changes in portions of the display data.

32. The computer readable medium as in claim 30, wherein identifying the first and second portions of the display data is performed using wavelet-based techniques.

33. The computer readable medium as in claim 30, wherein said program of instructions further includes instructions to manipulate a data processor to:
    identify at least a third portion of the display data having a third spatial component different from the first spatial component and the second spatial component; and
    filter the at least a third portion of the display data by a third amount, wherein the first amount second amount reduces flicker to a greater extent than the third amount.

34. The computer readable medium as in claim 31, wherein said program of instructions further includes instructions to manipulate a data processor to:
    compress the first and second portion of the display data.

35. The computer readable medium as in claim 34, wherein said instructions for compressing use sub-band compression techniques.

36. The computer readable medium as in claim 21, wherein said program of instructions further includes instructions to manipulate a data processor to:
    associate a first display component of a plurality of display components of the display data with the first portion based on an attribute of the first display component in a first direction; and
    associate a second display component of the plurality of display components of the display data with the second portion based on an attribute of the second display component in the first direction.

37. The computer readable medium as in claim 21, wherein the attribute of the first display component and the attribute of the second display component are determined using a band-based technique.

38. The computer readable medium as in claim 27, wherein the band-based technique includes a wavelet-based sub-band separation technique.

39. The computer readable medium as in claim 21, wherein the attribute of the first display component and the attribute of the second display component are determined using a size-based technique.

40. The computer readable medium as in claim 39, wherein the size-based technique includes:
    comparing a dimension of the first display component to a threshold; and
    comparing a dimension of the second display component to the threshold.

41. The computer readable medium as in claim 40, wherein the threshold is related to the Nyquist rate of the display.

42. The computer readable medium as in claim 40, wherein the dimensions of the attributes of the first and second display components are determined using changes in contrast.

43. The computer readable medium as in claim 40, wherein the dimensions of the attributes of the first and second display components are determined using changes in color.

44. The computer readable medium as in claim 30, wherein filtering is performed in a second direction.

45. The computer readable medium as in claim 44, wherein the first direction is orthogonal to the second direction.

46. The computer readable medium as in claim 45, wherein the first direction is horizontal.

47. A computer readable medium tangibly embodying a program of instructions, said program of instructions including instructions to manipulate a data processor to:
associate a first display component of a plurality of display components with a first set based on an attribute of the first display component in a first direction;
associate a second display component of the plurality of display components with a second set based on an attribute of the second display component in the first direction;
filter the first set at a first frequency range to reduce flicker on a display;
filter the second set at a second frequency range, where the second frequency range is higher than the first frequency range;
associate a third display component of the plurality of display components with a third set based on an attribute of the third display component in the first direction; and
filter the third set at a third frequency range, wherein the third frequency range is higher than the first frequency range and lower than the second frequency range.

48. The computer readable medium as in claim 47, wherein:
to filter the first set includes the use of a low-pass filter with a first cutoff frequency; and
to filter the second set includes the use of a low-pass filter with a second cutoff frequency.

49. The computer readable medium as in claim 47, wherein to filter the first, second and third set is performed in a second direction.

50. The computer readable medium as in claim 49, wherein the first direction is orthogonal to the second direction.

51. The computer readable medium as in claim 50, wherein the first direction is horizontal.

52. The computer readable medium as in claim 47, wherein the plurality of display components are represented by one or more data sets.

53. The computer readable medium as in claim 52, the second set is less susceptible to flicker.

54. The computer readable medium as in claim 47, wherein to filter is performed in a second direction, different from the first direction.

55. The computer readable medium as in claim 47, wherein the attribute of the first display component and the attribute of the second display component are determined using a band-based technique.

56. The computer readable medium as in claim 55, wherein the band-based technique includes a wavelet-based sub-band separation technique.

57. The computer readable medium as in claim 47, wherein the attribute of the first display component and the attribute of the second display component are determined using a size-based technique.

58. The computer readable medium as in claim 57, wherein the size-based technique includes:
comparing a dimension of the first display component to a threshold; and
comparing a dimension of the second display component to the threshold.

59. The computer readable medium as in claim 58, wherein the threshold is related to the Nyquist rate of the display.

60. The computer readable medium as in claim 58, wherein the dimensions of the attributes of the first and second display components are determined using changes in contrast.

61. The computer readable medium as in claim 58, wherein the dimensions of the attributes of the first and second display components are determined using changes in color.

62. The computer readable medium of claim 47, further including:
to scale the first and second display components; and
to where filtering the first set further includes filtering the first set to reduce aliasing associated with downscaling.

63. A system comprising:
a means for associating a first display component of a plurality of display components with a first set based on an attribute of the first display component in a first direction;
a means for associating a second display component of the plurality of display components with a second set based on an attribute of the second display component in the first direction;
a means for filtering the first set at a first frequency range to reduce flicker on a display;
a means for filtering the second set at a second frequency range, where the second frequency range is higher than the first frequency range;
a means for associating a third display component of the plurality of display components with a third set based on an attribute of the third display component in the first direction; and
a means for filtering the third set at a third frequency range, wherein the third frequency range is higher than the first frequency range and lower than the second frequency range.

64. The system as in claim 54, wherein:
the means for filtering the first set includes the use of a low-pass filter with a first cutoff frequency; and
the means for filtering the second set includes the use of a low-pass filter with a second cutoff frequency.

65. The system as in claim 54, wherein the means for filtering is performed in a second direction.

66. The system as in claim 65, wherein the first direction is orthogonal to the second direction.

67. The system as in claim 66, wherein the first direction is horizontal.

68. The system as in claim 54, wherein the plurality of display components are represented by one or more data sets.

69. The system as in claim 68, wherein the second set is less susceptible to flicker.

70. The system as in claim 54, wherein the means for filtering is performed in a second direction, different from the first direction.

71. The system as in claim 54, wherein the attribute of the first display component and the attribute of the second display component are determined using a band-based technique.

72. The system as in claim 71, wherein the band-based technique includes a wavelet-based sub-band separation technique.

73. The system as in claim 54, wherein the attribute of the first display component and the attribute of the second display component are determined using a size-based technique.

74. The system as in claim 73, wherein the size-based technique includes:
the means for comparing a dimension of the first display component to a threshold; and
the means for comparing a dimension of the second display component to the threshold.

75. The system as in claim 74, wherein the threshold is related to the Nyquist rate of the display.

76. The system as in claim 74, wherein the dimensions of the attributes of the first and second display components are determined using changes in contrast.

77. The system as in claim 74, wherein the dimensions of the attributes of the first and second display components are determined using changes in color.

78. The system of claim 54 further including:
a means for scaling the first and second display components; and
wherein the means for filtering the first set further includes filtering the first set to reduce aliasing associated with downscaling.

79. A system comprising:
a means for receiving a set of display data;
a means for identifying a first portion of the display data having a first spatial component;
a means for identifying a second portion of the display data having a second spatial component;
a means for filtering the first portion of the display data to reduce flicker by a first amount; and
a means for filtering the second portion of the display data by a second amount, wherein the first amount reduces flicker to a greater extent than the second amount.

80. The system as in claim 79, wherein a means for identifying the first and second portions of the display data include determining a frequency of contrast changes in portions of the display data.

81. The system as in claim 79, wherein the means for identifying the first and second portions of the display data include determining a frequency of color changes in portions of the display data.

82. The system as in claim 79, wherein the means for identifying the first and second portions of the display data are performed using a size-based technique.

83. The system as in claim 82, wherein the size-based technique includes a run length type encoding technique.

84. The system as in claim 79, wherein the means for identifying the first and second portions of the display data are performed using a band-based technique.

85. The system as in claim 84, wherein the band-based technique includes a wavelet-based sub-band separation technique.

86. The system as in claim 85, further including the means for compressing the first and second portions of the display data using sub-band compression techniques.

87. The system as in claim 79, wherein:
the means for filtering the first portion includes using a first low-pass filter having a first cutoff frequency; and
the means for filtering the second portion includes using a second low-pass filter having a second cutoff frequency different from the first cutoff frequency.

88. The system as in claim 87, wherein the means for identifying the first portion of the display data is performed in a first direction and the means for filtering the first and second portion are performed in a second direction.

89. The system as in claim 10, wherein the first direction is orthogonal to the second direction.

90. The system as in claim 11, wherein the first direction is horizontal.

91. The system as in claim 89, further including:
a means for identifying at least a third portion of the display data having a third spatial component different from the first spatial component and the second spatial component; and
a means for filtering the at least a third portion of the display data by a third amount, where the second amount reduces flicker to a greater extent than the third amount.

* * * * *

UNITED STATES PATENT AND TRADEMARK OFFICE
CERTIFICATE OF CORRECTION

PATENT NO. : 6,710,819 B2
DATED : March 23, 2004
INVENTOR(S) : Philip L. Swan

It is certified that error appears in the above-identified patent and that said Letters Patent is hereby corrected as shown below:

Column 16,
Line 65, please replace "as in claim 1," with -- as in claim 18 --

Column 17,
Line 3, please replace "as in claim 1," with -- as in claim 18 --

Column 18,
Lines 39, 51 and 58, please replace "as in claim 21," with -- as in claim 30 --
Line 55, please replace "as in claim 27," with -- as in claim 37 --

Column 19,
Line 59, please replace "claim 52, the," with -- claim 52, wherein the --

Column 20,
Lines 54, 59 and 65, please replace "as in claim 54," with -- as in claim 63 --

Column 21,
Lines 3, 6, 13 and 31, please replace "as in claim 54," with -- as in claim 63 --

Signed and Sealed this

Thirty-first Day of August, 2004

JON W. DUDAS
*Director of the United States Patent and Trademark Office*